Aug. 2, 1927.
J. C. RYAN
1,637,592
FLUSH TANK VALVE
Filed Oct. 11, 1926
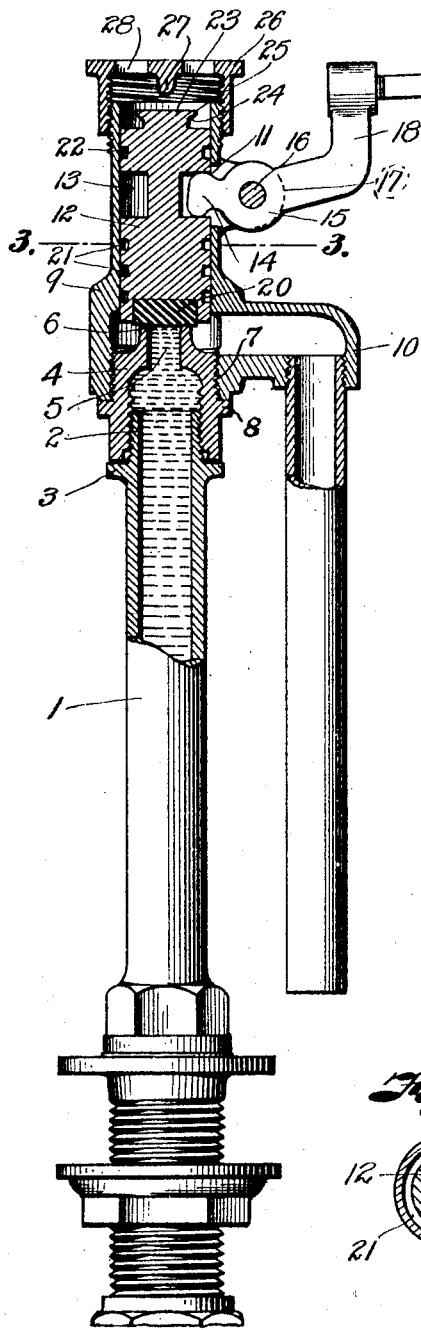
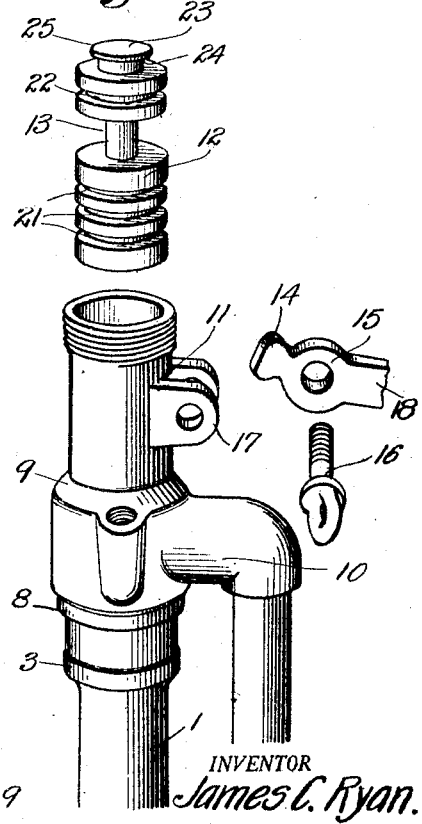
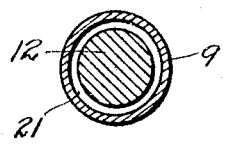
INVENTOR
James C. Ryan.
BY Arthur C. Brown
ATTORNEY Patented Aug. 2, 1927.

1,637,592

UNITED STATES PATENT OFFICE.

JAMES C. RYAN, OF KANSAS CITY, MISSOURI, ASSIGNOR TO ROSS MANUFACTURING COMPANY, OF KANSAS CITY, MISSOURI, A CORPORATION OF MISSOURI.

FLUSH-TANK VALVE.

Application filed October 11, 1926. Serial No. 140,785.

My invention relates to flush tank valves and more particularly to a device of that character whereby water is furnished to the tank under control of a float.

Valves of this type must be relatively free acting, but are subject to the relatively high pressures of city water supplies and subject to leakage if the valve has a sufficiently loose fit to provide for its operation under the float control.

It is the object of the present invention to provide a free working valve with means for preventing leakage through the upper end of the valve when the valve is open or, in any event, leakage in such volume and under such pressure as to discharge from the tank when the cover is removed.

In accomplishing this object I have provided improved details of structure the preferred forms of which are illustrated in the accompanying drawings, wherein:

Fig. 1 is an elevational view, partly in longitudinal section, of a valve embodying my improvements.

Fig. 2 is a perspective view of parts of the valve and its complementary elements in disassembled relation.

Fig. 3 is a cross section on the line 3—3, Fig. 1.

Referring more in detail to the drawings:

1 designates a stand-pipe which may be located in a flush tank (not shown) and comprises a threaded nipple 2 and a shoulder 3. Threaded onto the nipple 2 is a coupling 4 having restricted outlet 5 and a valve seat 6 at the end of the outlet, the coupling having exterior threads 7 outwardly of a shoulder 8.

Threaded onto the coupling 4 is a housing 9 having a downwardly opening discharge nozzle 10 and having a laterally opening slot 11. Slidably mounted within the housing is a cylindrical valve member 12 provided with an annular groove 13 opening to the slot 11 and adapted for seating an operating head 14 constituting one arm of a lever 15 which is pivoted on a threaded pin 16 carried by ears 17 projecting laterally from the valve housing at opposite sides of the slot 11.

The second arm 18 of the lever 15 carries a float 19 so that when the level of the water in the tank is lowered, the operating head will be rocked to lift the valve member, and when the level rises, the valve member will be lowered, thereby providing for opening and closing the valve automatically in the ordinary manner, the inner end of the valve member carrying a compressible facing 20 for sealing the supply outlet when the valve is seated.

Located in the periphery of the valve member between the said head seating groove 13 and the seat end of the cylinder is a plurality of unconnected annular grooves 21 forming chambers into which leakage about the valve member is interrupted at stepped intervals between the outlet from the stand-pipe and the head seating groove, and located within the cylinder at the opposite side of the head seating groove is an annular groove 22 serving as an interrupter for leakage escaping through the head seating groove.

On the outer end of the valve member is a boss 23 having an undercut groove 24 forming a handle flange 25 whereby the valve member may be grasped through the end of the housing and serving as a stop for limiting outward movement of the valve member.

The outer end of the housing is provided with a screw cap 26 having an inwardly extended pin 27 engageable by the boss on the valve member to limit movement of the valve member as above stated, the top of the cap being preferably provided with apertures 28 through which spacing between the boss on the valve member and the pin on the closing cap may be observed.

Assuming the parts to be constructed and assembled as described, when the tank is filled the float is raised to seat the valve member and cut off supply from the standpipe. When the tank is empty the float descends and the valve is opened permitting an inrush of water under considerable pressure. The water jets into the valve housing through the restricted outlet from the standpipe under sufficient pressure to be forced between the relatively loose fitting valve and the wall of the housing. If the valve should happen to be scored or the fitting sufficiently loose, a volume of water will be passed between the valve member and the housing so that, if no preventative means were provided, a jet might pass out through the housing causing inconvenience and possibly damage.

With the valve member provided with the series of disconnected grooves constituting the feature of my invention, such leakage passing the inner end of the valve will enter the first groove and spread therein losing its initial force. If the leakage is not stopped at the first groove, it passes into the second and is again interrupted so that, should it eventually reach the operating head groove, its force has been dissipated and the water will merely flow out from the groove through the slot in the housing and back to the tank. Should the water be under extraordinary pressure and leakage escape from the inner portion of the valve in a jet and thence between the outer part of the valve and the housing, the relatively small amount of water will be trapped in the outer part of the valve member so that there is small likelihood of any of it reaching beyond the valve.

What I claim and desire to secure by Letters Patent is:

1. A flush tank valve comprising a housing and valve seat, a cylindrical valve slidable in the housing having an operating head seating groove, and having a series of unconnected leakage collection grooves between the head seating groove and the seat end of the valve member and a leakage collection groove at the opposite side of the head seating groove, and an operating member having a head seated in the head seating groove.

2. In combination with a stand pipe, a valve seat on the stand pipe, a housing enclosing the valve seat and having an operating head slot, a cylindrical valve member having a peripheral groove opening to the housing slot and an operating lever pivoted to the housing having a head extended through said slot and seated in the peripheral groove, the valve member having a series of unconnected leakage collection grooves between said peripheral groove and the seat end of the valve member.

3. In combination with a stand pipe, a valve seat on the stand pipe, a housing enclosing the valve seat and having an operating head slot, a cylindrical valve member having a peripheral groove opening to the housing slot and an operating lever pivoted to the housing having a head extended through said slot and seated in the peripheral groove, the valve member having a series of unconnected leakage collection grooves between said peripheral groove and the seat end of the valve member and a leakage collection groove at the opposite end of said peripheral groove.

4. In combination with a stand pipe, a valve seat on the stand pipe, a housing enclosing the valve seat and having an operating head slot, a cylindrical valve member having a peripheral groove opening to the housing slot, an operating lever pivoted to the housing having a head extended through said slot and seated in said peripheral groove, the valve member having a series of unconnected leakage collection grooves between said peripheral groove and the seat end of the valve member, and a leakage collection groove at the opposite end of said peripheral groove, the valve member also having an undercut boss on its outer end, and an adjustable cap on the housing having a stop pin projected into the housing for engagement by said boss.

In testimony whereof I affix my signature.

JAMES C. RYAN.